UNITED STATES PATENT OFFICE.

ERNEST EDWARD MUNRO PAYNE, OF LEICESTER, ENGLAND, ASSIGNOR OF ONE-HALF TO WILLIAM HENRY STAYNES, OF LEICESTER, ENGLAND.

PURIFICATION OF WATER.

1,002,603.     Specification of Letters Patent.     Patented Sept. 5, 1911.

No Drawing.     Application filed August 4, 1909. Serial No. 511,166.

*To all whom it may concern:*

Be it known that I, ERNEST EDWARD MUNRO PAYNE, a subject of the King of England, residing at Leicester, in England, have invented certain new and useful Improvements in the Purification of Water, of which the following is a specification.

This invention relates to improvements in the purification of water, the object being to free the water from suspended organic matter, lime salts and other metallic salts, such as carbonates of calcium and magnesium, sulfates, chlorid of calcium, magnesia, iron, alumina, etc. It is a comparatively easy matter to get rid of the temporary hardness but it is frequently difficult to get rid of the permanent hardness completely.

According to this invention the permanent hardness is removed from water by the addition of tri-sodium-phosphate ($Na_3PO_4$). Preferably the temporary hardness is removed by the addition of sufficient caustic soda to combine with all the carbonic acid existing as such or in the form of acid carbonates and adding tri-sodium-phosphate ($Na_3PO_4$).

Conveniently the precipitants are added simultaneously. These precipitants may be prepared by mixing common phosphate of soda ($Na_2HPO_4$) with caustic soda so as to produce tri-sodium-phosphate ($Na_3PO_4$) and to leave the desired amount of excess of free caustic soda in the mixture when dissolved in hot pure water, according to the equation:

$$Na_2HPO_4 + NaHO = Na_3PO_4 + H_2O$$

The following is a description of the methods of carrying this invention into effect.

A sample of the water is analyzed. The amount of caustic soda necessary to combine with all the carbonic acid existing as such or as acid carbonates is calculated according to the equations:

$$CaH_2 2(CO_3) + 2NaHO =$$
$$CaCO_3 + Na_2CO_3 + 2H_2O$$

and a solution containing the caustic soda and tri-sodium-phosphate is added to the water which is then agitated. The reactions which occur may be stated as follows:—

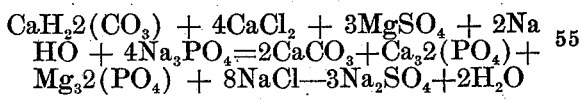

The water is then allowed to rest and phosphates of the metals in solution are formed as a gelatinous bulky whitish precipitate which coagulates and settles carrying with it practically the whole of the suspended impurities.

Taking for example a water containing 40 parts of total solids in 100,000 parts; consisting of 18 parts of suspended and 22 of dissolved impurities the latter consisting chiefly of carbonates of calcium and magnesium sulfates and chlorids and an appreciable amount of iron and alumina salts. The amount of contained carbonic acid was estimated and found to be 4 parts per 100,000, according to the formula:

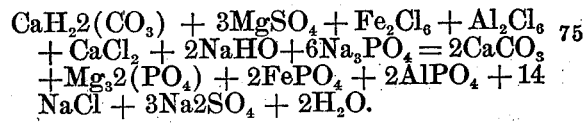

8½ lbs. of solid phosphate of soda ($Na_2HPO_4 12H_2O$) is mixed with 4 lbs. of caustic soda solution sp. gr. 1400—containing approximately 1½ lbs. of caustic soda. These are dissolved in 10 gallons of hot purified water. At this stage we have a solution of tri-sodium phosphate containing excess of caustic soda. This solution is poured into 1000 gallons of the impure water and the whole is agitated. After twelve to twenty hours settling a pure water is decanted sufficiently free as regards metallic contamination to be serviceable for manufacturing and other purposes, whereas the original water was quite useless.

By the usual chemical tests such as ammonium oxalate, etc., the purified water was found to be practically freed from the original objectionable contamination.

The sludge precipitate is run off through sludge cocks and is either dried and used for its manurial value, or for the preparation of superphosphates for agricultural purposes. The sludge consists of mixed carbonates of calcium, magnesium, etc. (depending on the amount of carbonic acid and acid carbonates in the original water) and all the original suspended impurities and mixed phosphates of the metals present in the original water. Certain of these phosphates are soluble in water containing carbonic acid but by the above process all the carbonic acid is removed and the phosphates are practically insoluble.

This invention has been described with the use of sodium salts but it is to be understood that similar salts of potassium, or ammonium may be used alone or together if desired.

What I claim as my invention and desire to secure by Letters Patent is:—

1. The herein described method of treating water, which consists in adding thereto a caustic alkali in a sufficient quantity to combine with the carbonic acid and acid carbonates contained in the water, and also adding tri-sodium-phosphate, thereby forming normal phosphates of the metals held in solution in the water and causing their precipitation.

2. The herein described method of treating water, which consists in adding to the water a solution of tri-sodium-phosphate containing an excess of caustic soda, the soda being sufficient to combine with the carbonic acid and acid carbonates contained in the water, and the tri-sodium phosphate forming normal phosphates of the metals in solution in the water and the precipitation thereof.

3. The herein described method of treating water, which consists in adding caustic alkali to the water to combine with its contained carbonic acid and acid carbonates and also adding tri-sodium-phosphate, then agitating the water and allowing it to settle to allow normal phosphates of the metals held in solution to precipitate, and then decanting the clear water therefrom.

In testimony whereof I have signed my name to this specification in the presence of two subscribing witnesses.

ERNEST EDWARD MUNRO PAYNE.

Witnesses:
   GEO. MORGAN,
   WALTER H. STURGES.